(12) United States Patent
Ohishi

(10) Patent No.: US 7,725,004 B2
(45) Date of Patent: May 25, 2010

(54) INFORMATION RECORDER, INFORMATION RECORDING MEDIUM, AND INFORMATION RECORDING METHOD

(75) Inventor: Takuo Ohishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1028 days.

(21) Appl. No.: 10/581,452

(22) PCT Filed: Jul. 16, 2004

(86) PCT No.: PCT/JP2004/010209

§ 371 (c)(1),
(2), (4) Date: Jun. 1, 2006

(87) PCT Pub. No.: WO2005/066959

PCT Pub. Date: Jul. 21, 2005

(65) Prior Publication Data

US 2007/0097801 A1    May 3, 2007

(30) Foreign Application Priority Data

Dec. 26, 2003  (JP) .............................. 2003-434623

(51) Int. Cl.
*H04N 5/783* (2006.01)
(52) U.S. Cl. .................. 386/68; 386/124; 386/125; 386/126; 386/111; 375/240.12
(58) Field of Classification Search .................. 386/68, 386/124–126

See application file for complete search history.

(56) References Cited

U.S. PATENT DOCUMENTS

| | | | |
|---|---|---|---|
| 5,708,631 A | 1/1998 | Takenaka et al. | |
| 7,035,333 B2* | 4/2006 | Stenzel | 375/240.12 |
| 7,437,059 B1* | 10/2008 | La et al. | 386/126 |
| 2002/0075958 A1* | 6/2002 | Shiro | 375/240.13 |
| 2003/0103566 A1* | 6/2003 | Stenzel | 375/240.12 |
| 2003/0163824 A1* | 8/2003 | Gordon et al. | 725/90 |
| 2006/0203918 A1* | 9/2006 | Okada | 375/240.25 |

FOREIGN PATENT DOCUMENTS

| | | | |
|---|---|---|---|
| JP | 06-036521 | * | 6/1992 |
| JP | 6-36521 A | | 2/1994 |
| JP | 8-180654 A | | 7/1996 |
| JP | 08-331509 | * | 12/1996 |
| JP | 8-331509 A | | 12/1996 |
| JP | 9-200675 A | | 7/1997 |
| JP | 10-232884 A | | 9/1998 |
| JP | 2000-187964 A | | 7/2000 |
| JP | 2001-76474 A | | 3/2001 |
| JP | 2001-338484 A | | 12/2001 |
| JP | 2002-150751 A | | 5/2002 |
| JP | 2003-196297 A | | 7/2003 |

* cited by examiner

*Primary Examiner*—Thai Tran
*Assistant Examiner*—Helen Shibru
(74) *Attorney, Agent, or Firm*—Dickstein Shapiro LLP

(57) ABSTRACT

An information recording device for recording a content in an information recording medium. A controller includes a creating unit for creating a time sequence index information group and a reverse time sequence index information group based on plural index information items extracted from time series data, and a recording unit for recording the index information groups in an area different from an area where the time series data are recorded.

11 Claims, 10 Drawing Sheets

INFORMATION RECORDER, INFORMATION RECORDING MEDIUM, AND INFORMATION RECORDING METHOD

TECHNICAL FIELD

The present invention relates to a technique for recording content in the form of time series data in an information recording medium such as an optical disk, a magnetic disk, and an ID card, and reproducing a specified point of the recorded content.

BACKGROUND ART

It has been common to convert data representing contents, such as moving picture data, still picture data, and text data, into time series data, and record the converted time series data into information recording media including, e.g., optical disks such as CD-R discs, CD-RW discs, CD-MRW discs, DVD-R discs, DVD-WR discs, DVD-RAM discs, DVD+R discs, and DVD+RW discs, magneto optical disks such as MOs and MDs, magnetic disks such as HDs and FDs, and IC cards such as nonvolatile RAMs and flash ROMs. When recording the contents, an information recording medium suitable for the content to be recorded is selected. Also, an information recording device such as a CD drive, a DVD drive, an MO drive, an MD drive, an HD drive, an FD drive, or an IC card drive, applicable to the selected information recording medium is selected. The selected drive is used for recording and reproducing the content.

FIG. 10 shows layout examples of an information recording medium for recording and reproducing time series data in linear addressing.

This information recording medium has a recording/reproducing area divided into sectors of a fixed size. Areas shown in FIG. 10 are application level areas each having a size larger than the size of sectors. It is to be noted that the proportion of the size of the areas does not correspond to the proportion of the actual data volume of the areas.

Referring to (a) of FIG. 10, a recording area 40 of the information recording medium includes a Lead-In area 41 at the top. The Lead-In area 41 is the area from which reading of information recorded in the information recording medium is started when the information recording medium is loaded in an information reproducing device or an information recording/reproducing device. The Lead-In area 41 contains general information about the information recording medium such as information about the information recording medium itself and information about data layout.

The Lead-In area 41 is followed by a user recordable area 42 in which users can record content represented by time series data and the like. The user recordable area 42 is the only area where users can record data.

The address of the top sector of the user recordable area 42 is zero, and is represented as "LBA:0" (indicated by the arrow in FIG. 10). The user recordable area 42 has points called anchor points at addresses specified depending on file systems of operating systems.

The anchor points serve as marks for jumping to another area over areas on the way in response to an instruction. The user recordable area 42 may have one or more anchor points. In the example shown in FIG. 10, the anchor points are provided at the start position of a content area 44 and a start position of a Lead-Out area 46.

A file system area 43 in the user recordable area 42 is for defining stored location of individual files and directories, the size, time, attribute, etc. The file system area 43 is followed by the content area 44 where content represented by the time series data is recorded.

The content area 44 may be followed by a miscellaneous data area 45 where data excluding the content are recorded. The miscellaneous data area 45 is not necessarily required.

At the end, an area called as the Lead-Out area 46 is provided, which continues near the end limit of the information recording medium. The Lead-Out area 46 allows the information recording/reproducing device to recognize the end of a recording area 40 when recording/reproducing the content by receiving a light irradiated from an optical pickup and reflected by the information recording medium.

In many cases, the time series data representing the content occupy the greater part of the information recording medium. The areas provided in the information recording medium need to be continuous to each other. If there is non-recorded areas 47 as shown in FIG. 10 (b), regular information reproducing devices of reproduction-only type cannot reproduce the content. This indicates lowered compatibility of the information recording medium.

The time series data recorded in the information recording medium may be large-volume data containing, as the content thereof, images, sounds, maps, an encyclopedia or the like. Such large-volume data are often provided with index information items (index data) for referring to segmentation points of the recorded content. The index information items may be, for example, chapter images recorded together with a moving picture. The chapter images may be selected and prepared by, e.g., a producer of the moving picture or may be automatically created by the information recording/reproducing device, and are recorded as a part of data representing the moving picture into a CD (CD) or a DVD (Digital Versatile Disc) in which the data representing the moving picture is recorded.

In many cases, the chapter images selected by the producer correspond to important scenes of the moving picture. Accordingly, users can use the chapter images as the index information items and select one of the chapter images to playback the desired part of the moving picture.

However, the chapter images selected from the moving picture by the producer and recorded as the index information items in the user recordable area cannot always be effective index information items to the users as the users may have different tastes and preferences.

A technique is disclosed in Japanese Patent Laid-Open Publication No. 2001-76474 that sequentially replays chapter images as index information items so as to allow users to quickly overview content and select a desired chapter image, and thus replays the desired part of the content.

DISCLOSURE OF THE INVENTION

Problems to be Solved by the Invention

The disclosed technique allows users to see the chapter images as the index information items and quickly overview the content. However, the users need to select a chapter image corresponding to the desired part of the content. Accordingly, unless the users know well the whole content, the users cannot effectively use the chapter images to see the desired part. That is, the sequentially replayed chapter images do not serve as index information items for showing the users the digest of the content.

The above-described technique is for authoring index information items for content that is recorded in advance in an information recording medium and for recording the index information items into the information recording medium, and is not for recording index information items for content added to the information recording medium by a user or the content rewritten by a user.

In view of the above-described problems, the present invention aims to provide an information recording device, an information recording medium, and an information recording method that allow quickly overviewing content recorded in an information recording medium in advance and content recorded by a user and reproducing a selected part of the recorded content.

Means for Solving the Problems

According to an aspect of the present invention, there is provided an information recording device comprising a controller that adjusts recording conditions including a bit rate of time series data when recording content in an information recording medium, wherein the controller includes an index information group creating unit that creates a time sequence index information group in which index information items extracted from the time series data for locating particular points of the content are arranged in time sequence of the time series data, and a reverse time sequence index information group in which the index information items are arranged in reverse time sequence of the time series data; and an index information group recording unit that records the time sequence index information group and the reverse time sequence index information group created by the index information group creating unit into an area of the information recording medium different from an area where the time series data are recorded.

According to another aspect of the present invention, there is provided an information recording method that records content in the form of time series data in an information recording medium and reproduces particular points of the content, the method comprising: an index information group creating step of creating a time sequence index information group in which index information items extracted from the time series data for locating the particular points of the content are arranged in time sequence of the time series data, and a reverse time sequence index information group in which the index information items are arranged in reverse time sequence of the time series data; and an index information group recording step of recording the time sequence index information group and the reverse time sequence index information group created in the index information group creating step into an area of the information recording medium different from an area where the time series data are recorded.

Since the time sequence index information group and the reverse time sequence index information group are created and recorded in the information recording medium together with the time series data representing the content, a particular point of the content can be easily detected and reproduced even if the data volume is large.

It is preferable that the index information group creating unit acquire, as the index information items, plural image data items representing plural images that are extracted from the time series data every predetermined time. It is also preferable that when the content recorded in the form of the time series data is reproduced, the index information group creating unit extract, as the index information items, plural image data items representing plural images that are selected, according to a predetermined instruction, from images that change with time.

The former is advantageous in that index information items that suit users' preferences can be extracted. If ignoring users' preferences, the latter is convenient for busy users because the index information items are acquired while recording the content so as to have the index information groups recorded upon completion of recording the content.

If the index information group recording unit records the time sequence index information group and the reverse time sequence index information group into an area adjacent to the area where the time series data are recorded, quick search and reproduction can be provided. If the time sequence index information group and the reverse time sequence index information group are recorded in the following area adjacent to a content area, adding and rewriting of content can be accepted. The time sequence index information group and the reverse time sequence index information group can be recorded in an area adjacent to a Lead-In area or a Lead-Out area of the information recording medium. Since the position of the Lead-In area and the Lead-Out is obvious, searching operations can be further facilitated. The index information group recording unit can record the time sequence index information group and the reverse time sequence index information group into a predetermined area of an information recording medium, such as an IC card or a disk, different from the information recording medium in which the time series data are recorded. This can eliminate the need of considering reproduction compatibility.

According to a further aspect of the present invention, there is provided an information recording medium in which content in the form of time series data are recorded, comprising: a first area in which the time series data is recorded; and a second area in which a time sequence index information group and a reverse time sequence index information group are recorded, the time sequence index information group containing index information items, which are extracted from the time series data for locating particular points of the content, arranged in time sequence of the time series data, the reverse time sequence index information group containing the index information items arranged in reverse time sequence of the time series data.

As the time series data representing the content and the index information groups of forward and backward directions of recording are recorded, a particular point of the recorded content can be easily reproduced.

ADVANTAGEOUS EFFECT OF THE INVENTION

According to an information recording device, an information recording medium, and an information recording method as embodiments of the present invention, an index information group of a forward direction according to the progress of recorded content and an index information group of the reverse direction are recorded. Therefore, even if the size of the content is large, it is easy to quickly overview the content recorded in advance and the content added by a user, and to locate and reproduce a particular part of the recorded content.

DESCRIPTION OF REFERENCE NUMERALS

Figure 1:
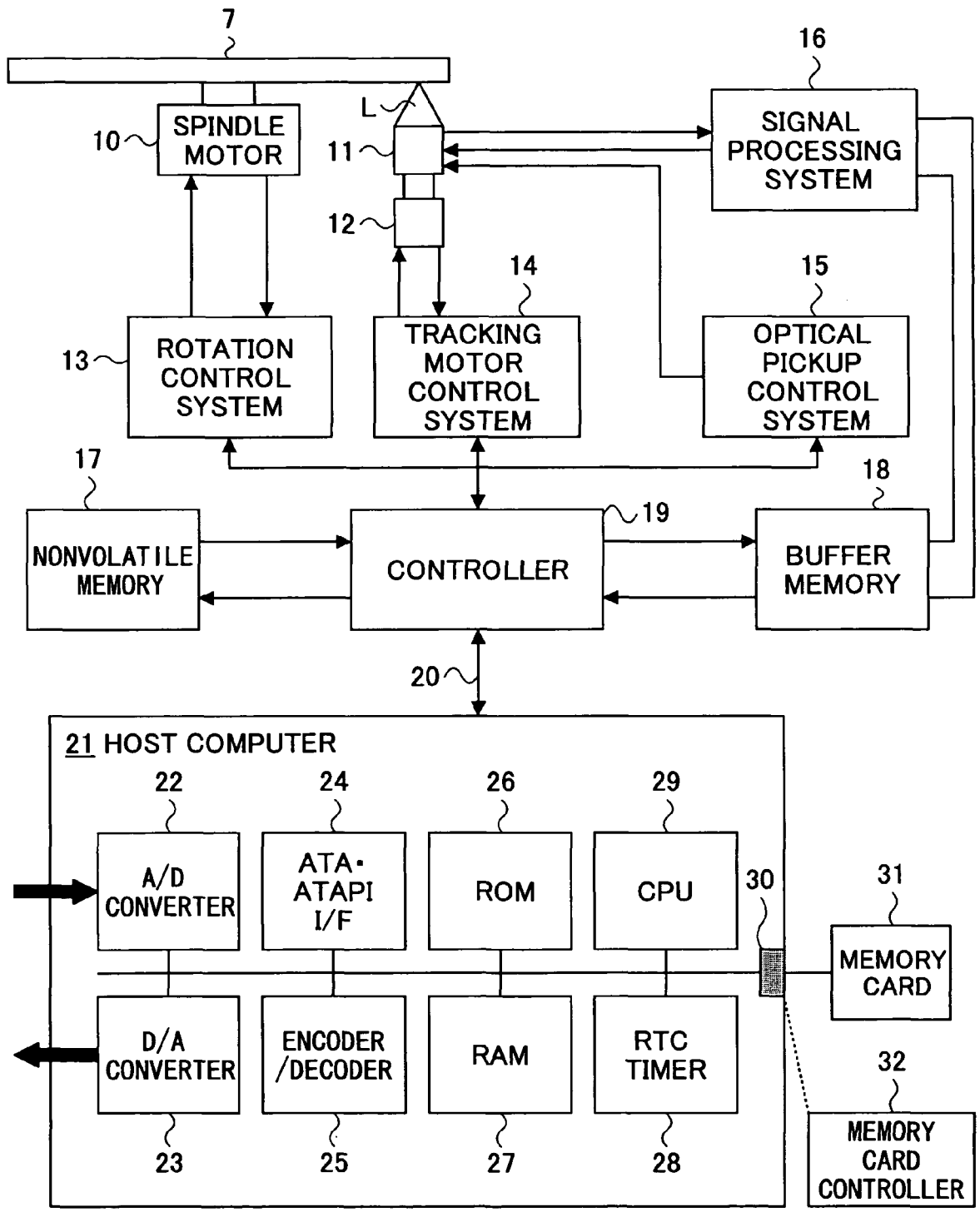
FIG. 1 is a block diagram showing a configuration of an optical disk recording device (optical disk drive) according to an embodiment of the present invention.

| | |
|---|---|
| 1, 4 | optical disk recording device |
| 2, 5 | input device |
| 3, 6 | display device |
| 7 | optical disk |
| 8 | editing/recording device |
| 10 | spindle motor |
| 11 | optical pickup |
| 12 | tracking motor |
| 13 | rotation control system |
| 14 | tracking motor control system |
| 15 | optical pickup control system |
| 16 | signal processing system |
| 17 | nonvolatile memory |
| 18 | buffer memory |
| 19 | controller |
| 20 | external interface |
| 21 | host computer |
| 22 | A/D converter |
| 23 | D/A converter |
| 24 | ATA/ATAPI interface |
| 25 | encoder/decoder |
| 26 | ROM |
| 27 | RAM |
| 28 | RTC timer |
| 29 | CPU |
| 30 | memory card slot |
| 31 | memory card |
| 32 | memory card controller |
| 33 | recording area |
| 40 | Lead-In area |
| 41 | user recordable area |
| 42 | file system area |
| 44 | content area |
| 45 | miscellaneous data area |
| 46 | Lead-Out area |
| 47 | non-recorded area |
| 48 | index area |
| 49 | TLO area |
| 50 | anchor point |
| 51 | zero (address) |

BEST MODE FOR CARRYING OUT THE INVENTION

The following describes preferred embodiments of the present invention with reference to the accompanying drawings.

According to one embodiment of the present invention, when content that changes with time is converted to time series data and recorded in an information recording medium, a time sequence index information group in which plural user definable index information items are arranged in time sequence and a reverse time sequence index information group in which the index information items are arranged in reverse time sequence are recorded for easier search in place of conventional index information items.

Users can define the type, time intervals, and the number of the index information items with little restriction. The index information items can be created by storing a part of the content (e.g. image data or audio data) using timers of information recording devices.

For example, if a user wants to see a digest of the content in a forward direction (in time sequence), an information recording/reproducing device sequentially reads the index information items in the time sequence index information group and sequentially reproduces the read index information items to show the digest in the forward direction.

If the user wants to see the digest of the content in a backward direction (in reverse time sequence), the information recording/reproducing device sequentially reads the index information items in the reverse time sequence index information group and sequentially reproduces the read index information items to show the digest in the backward direction.

Thus the user can smoothly see the details of the content in the form of the forward direction digest based on the time sequence index information group and the backward direction digest based on the reverse time sequence index information group, and can quickly reach the desired part of the content.

In the case of existing information recording devices and information reproducing devices, there is no problem in recording content into and reproducing content from, e.g., DVD video disks and video CDs for which standards define that a continuous recording area for time series data is provided. However, it is difficult to record index information items that suit a user's preferences but that are not covered by the standards for the existing information recording devices and information reproducing devices, i.e., to add new user-defined index information items, into information recording media while maintaining recording and reproduction compatibilities with the existing information recording devices and information reproducing devices.

According to one embodiment of the present invention, separately from a recording area for the time series data, a recording area for recording and storing the index information items is provided in an information recording medium.

The index information items are located to precede or follow the time series data to allow continuous access to the index information items and the content, thereby preventing lowering of search performance due to discontinuous access.

Moreover, the time series data are recorded in the front part or the rear part of the recording area of the information recording medium so as to minimize influence of adding time series data. The location of the existing index area can be moved. When a user searches for a scene, the digest of the content can be replayed not only in the forward direction of the progress of time but also in the backward direction and can be displayed smoothly. Thus the user can quickly reach the target scene or the target data, which indicates improved usability.

In the case where a user selects the backward direction digest, if the recording medium contains only the conventional time sequence index information group in which index information items are arranged in time sequence, the recording/reproducing device reads the index information items one by one from the time sequence index information group in the reverse order of the time sequence. Otherwise, the recording/reproducing device reads all the index information items and temporarily holds the read items in a memory and rearranges the items in the memory so as to enable backward playback.

For smoothly displaying the backward direction digest without irritating the user, in the case of reading the index information items one by one from the time sequence index information group in the reverse time sequence, the recording/reproducing device needs quick and high responsiveness and high specifications in terms of hardware. In the case of rearranging the index information items, a large volume primary memory is required. That is, both of the above options are disadvantageous in terms of cost to manufacture hardware.

Embodiments

Figure 2:
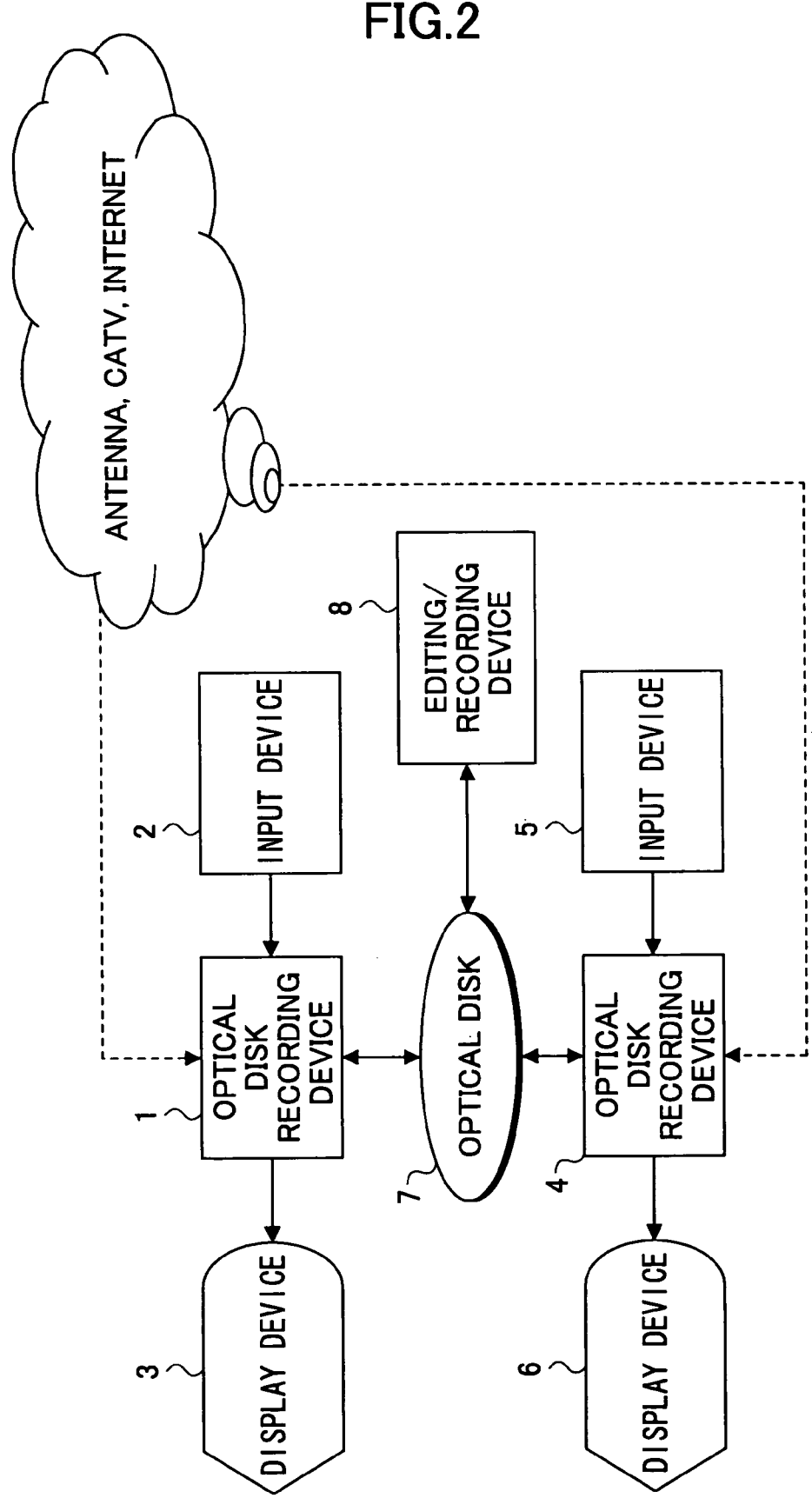
FIG. 2 is a block diagram showing a configuration of a computer system equipped with optical disk recording devices according to an embodiment of the present invention.

FIG. 2 is a block diagram showing a configuration of a computer system equipped with optical disk recording devices according to an embodiment of the present invention.

The upper optical disk recording device 1 is an easy-to-use device with high usability, and is provided with an input device 2. The optical disk recording device 1 can receive image and audio data from other media such as antennas, CATVs, and the Internet via a tuner or a network interface and can store the received data in an optical disk 7. It may be convenient if the optical disk recording device 1 is provided with a display device 3 such as a CRT or an LCD although one is not necessarily required.

The lower optical disk recording device 4 is embedded in a computer serving as a host computer or a personal computer, and receives instructions from an input device 5 including a keyboard and a mouse. The optical disk recording device 4 is also equipped with a display device 6 such as a CRT or an LCD. The optical disk recording device 4 is for more detailed editing and searching operations. The input device 5, including a remote controller, the keyboard, and the mouse, also serves as a device for inputting and selecting index data. The optical disk recording device 4 can receive image and audio data from other media, such as the antennas, the CATVs and the Internet via a tuner and a network interface, and can store the received data in the optical disk 7 with or without editing the data.

Both the optical disk recording devices 1 and 4 are connected to a host computer via an interface such as ATAPI.

An editing/recording device 8 shown in the center is a dedicated device used in studios or the like. In many cases, the editing/recording device 8 can perform complex authoring and is designed for use by professionals. The optical disk recording devices in this embodiment can record time series data representing contents according to the place of use and according to the intended use.

FIG. 1 is a block diagram showing a configuration of an optical disk recording device (optical disk drive) according to an embodiment of the present invention.

This optical disk drive corresponds to each of the optical disk recording devices 1 and 4, and is a recording device such as a DVD+RW drive that records data into the optical disk (recording medium) 7 such as a DVD+RW disc capable of recording and reproducing data. The optical disk drive comprises a spindle motor 10, a rotation control system 13 that controls rotation of the spindle motor 10, and an optical pickup 11 that irradiates a laser beam L for recording data into and reproducing data from the optical disk 7.

The optical disk drive further comprises an optical pickup control system 15 that controls irradiation of the laser beam L of the optical pickup 11, a tracking motor 12 that moves the optical pickup 11 in the radial direction of the optical pickup 11, a tracking motor control system 14 that controls rotation of the tracking motor 12, a signal processing system 16 that controls output of reproduction signals from the optical pickup 11 and input of recording signals to the optical pickup 11, a nonvolatile memory 17 that stores various programs, and a controller 19 that controls the signal processing system 16 and the tracking motor control system 14 so as to record contents and index information into the optical disk 7 by executing the programs stored in the nonvolatile memory 17.

The controller 19 is a microcomputer including a CPU, a register, and a RAM, and comprises an index data creating unit 19a for creating a time sequence index information group in which index information items for locating the addresses of particular points of time series data are arranged in time sequence of the time series data, and a reverse time sequence index information group in which the index information items are arranged in reverse time sequence, and an index data recording unit 19b for recording the time sequence index information group and the reverse time sequence index information group created by the index data creating unit 19a into an area of the optical disk 7 different from the area where the time series data are recorded.

The optical disk drive further comprises a buffer memory (cache memory) 18 that temporarily holds data such as data to be recorded into the optical disk 7 and data reproduced from the optical disk 7 and is used as an area for temporarily holding data when the controller 19 performs various operations, and an external interface 20 that transmits data to and receives data from the externally connected host computer 21.

This optical disk drive loads data read from the optical disk 7 into the buffer memory 18 and then transfers the data to the host computer 21. Data transmitted from the host computer 21 is loaded into the buffer memory 18, converted into time series data with a predetermined bit rate by the signal processing system 16 according to a control instruction from the controller 19, and recorded in the optical disk 7. Operations such as starting, suspending, and restarting recording and operations such as loading and ejecting optical disks are controlled by the controller 19. The optical disk drive communicates with the host computer 21 via the external interface 20. More specifically, the host computer 21 issues commands, and the optical disk drive responds to the commands.

The controller may be integrated in the host computer 21. If the controller is integrated in the host computer 21, the optical disk drive and the host computer 21 are connected via an analog interface.

The host computer 21 comprises an A/D converter 22 that converts picture signals from the outside (the antennas and the networks) from analog to digital, an encoder/decoder 25 that performs compression and expansion of the AD converted picture signals (these operations may be performed by a CPU at high speed instead), a D/A converter 23 that performs DA conversion (for output to a display device) using a PAL/NTSC video encoder, a RTC (real time clock) timer 28 that measures record time and indicates actual clock time so as to trigger index generation or to provide a content of index, an ATA/ATAPI interface 24 that communicates with the optical disk drive and a hard disk drive (not shown), the CPU 29, a ROM 26, and a RAM 27.

The RAM 27 is used as a buffer for work memory and image/audio data.

The ROM 26 stores programs for controlling the host computer and an operating system.

Although the ROM 26 may be a mask ROM, it may preferably be a nonvolatile flash ROM for facilitating version upgrade because the nonvolatile flash ROM allows collectively rewriting data stored therein.

The optical disk drive further comprises a memory card controller 32 for loading data, such as images taken by digital cameras, from a memory card 31 loaded in a memory card slot 30, and for recording index data into the memory card 31.

The memory card 31 is typically a removable flash ROM, and can be used for sending and receiving digital data to and from not only personal computers and but also various other devices.

In place of the controller 19 of the optical disk drive, the CPU 29 of the host computer 21 may provide a function for creating a time sequence index information group and a reverse time sequence index information group, and a function for recording the time sequence index information group and the reverse time sequence index information group into an information recording medium.

In that case, various programs (and various settings) are stored in the ROM 26, and the CPU 29 executes the programs so as to control the controller 19 for providing the above-described functions.

In this computer system, if these functions are provided by the optical disk drive, the controller 19 controls recording of index information items into the optical disk 7. If the host computer 21 is also used to provide these functions, both the controller 19 and the CPU 29 control recording of the index information items into the optical disk 7.

For instance, when recording video data into the optical disk 7 is started, a command for writing the created video data and predetermined chapter image data is issued from the host computer 21. Separately from this operation, the CPU 29 or the controller 19 generates index information items from frames of the video data or data elements each indicating recorded time (e.g. recorded time based on Greenwich mean time and elapsed time from the recording start time) of the corresponding part of the video data, and records the generated index information into the optical disk 7 at the right time during or after recording of the video data.

The following describes formats used for recording the content represented by the time series data and the index information items into the optical disk 7 in the optical disk drive.

Figure 3:
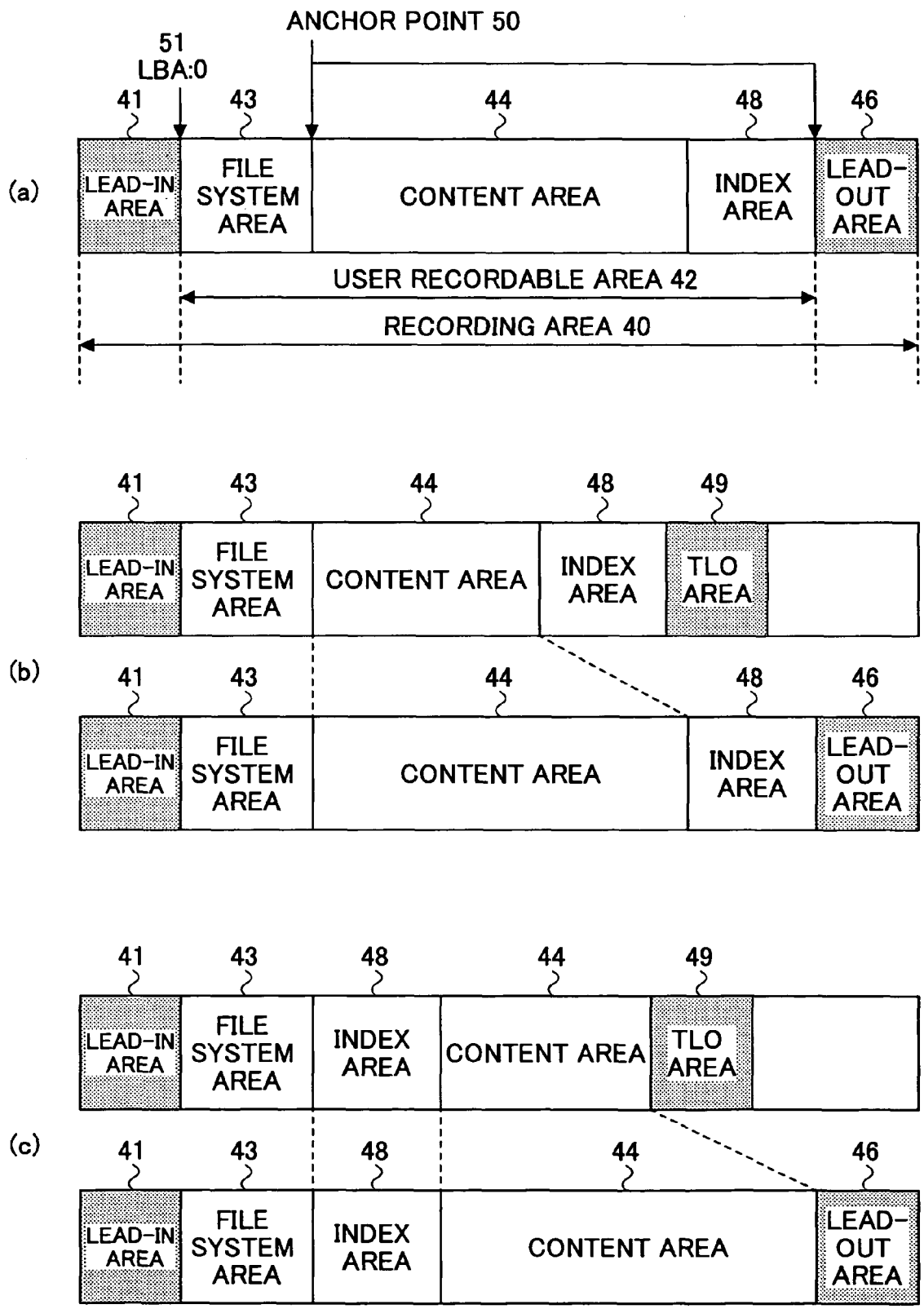
FIG. 3 shows formats in each of which an index area is provided at either side of a content area of an optical disk.

FIG. 3 shows formats in each of which an index area is provided at either side of a content area of the optical disk.

Referring to FIG. 3(*a*), the top of a recording area 40 of the optical disk is a Lead-In area 41 in which general information about the optical disk such as information about the optical disk itself and layout information of recorded units located after the Lead-In area 41 are recorded. The Lead-In area 41 is followed by a user recordable area 42 in which users can record data. The address assigned to the top sector (or the top block) of the user recordable area 42 is zero "LBA:0" 51. The user recordable area 42 includes a file system area 43 at the top thereof, in which the recorded location, the size, time, attribute, etc., of individual files and directories are defined, and an anchor point 50 next to the file system area 43.

The file system area 43 is followed by the content area 44 that stores the time series data representing the content. The content area 44 is followed by an index area 48 that stores a time sequence index information group in which the index information items for locating the addresses of particular points of the time series data are arranged in time sequence and a reverse time sequence index information group in which the index information items are arranged in reverse time sequence.

As can be seen, the time sequence index information group and the reverse time sequence index information group are recorded in the index area 48 separately from the time series data recorded in the content area 44 in the optical disk 7. In the index area 48, the time sequence index information group may precede or follow the reverse time sequence index information group.

Following another anchor point 50, a Lead-Out area 46 is provided at the end.

As shown in (a) of FIG. 3, in the case where no changes will be made to the time series data stored in the content area 44, the index area 48 can be located immediately after the content area 44 and immediately before the Lead-Out area 46.

However, in the case where, for example, data are added to the time series data, the index area 48 is moved or overwritten. In that case, as shown in FIG. 3 (*b*), the index area 48 is located immediately after the content area 44 and immediately before a TLO (Temporary Lead-Out) area 49. This format is used only for rewritable optical disks.

If, as shown in (c) of FIG. 3, the index area 48 is located (immediately) before the content area 44, the content area 44 does not need to be moved. As the size of the index area 48 is fixed, this format is useful for write-once optical disks. However, for improved compatibility, it is necessary to have data recorded in the Lead-In area 41 through the Lead-Out area 46 without discontinuity.

In the formats described above, the time sequence index information group may precede or follow the reverse time sequence index information group in the index area 48.

Figure 4:
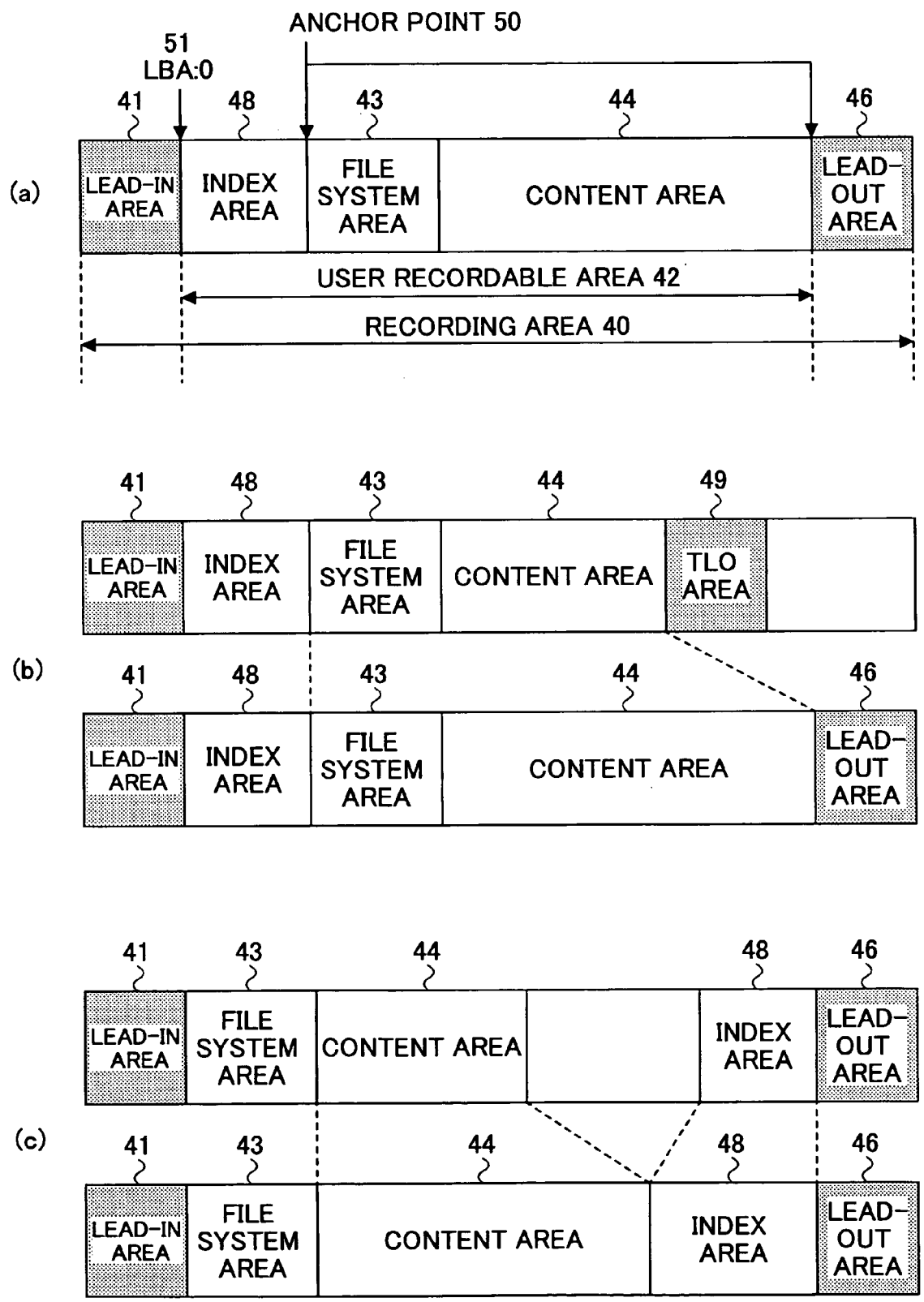
FIG. 4 shows formats in each of which an index area is provided at the top or the end of a content area of an optical disk.

FIG. 4 shows formats in each of which an index area is provided at the top or the end of a content area of an optical disk.

In these formats, a time sequence index information group may precede or follow a reverse time sequence index information group in an index area 48.

The index area 48 may be located at the top of a user recordable area 42 immediately behind a Lead-In area 41 as shown in FIG. 4 (*a*), or may be located at the end of the user recordable area 42 immediately ahead of a Lead-Out area 46.

The index area 48 located at the top or the end of the user recordable area 42 can be easily detected, thereby improving responsiveness.

If, as shown in FIG. 4 (*b*), the index area 48 is located at the top of the user recordable area 42, the size of the index area 48 is fixed as in the case of (c) of FIG. 3. Accordingly, although the size is fixed, ample index information can be provided if the index area 48 has a sufficient size.

If the index area 48 is located at the end of the user recordable area 42 as shown in (c) of FIG. 4, content can be easily added or rewritten. This improves reproduction compatibility. This format is advantageous in that the size of both a content area 44 and the index area 48 can be increased. This format is advantageous especially for index information items that are frequently updated because addresses with smaller numbers are assigned to more recent data. On the other hand, it may be slightly disadvantageous in performing search operations afterward because the index area 48 is extended in the negative direction upon increasing the size thereof.

In the case of this format, it is most preferable to use fully formatted rewritable optical disks for enabling random access.

For example, discs such as DVD+RW discs and CD-MRW discs on which background formatting can be performed provide enhanced convenience. Write-once optical disks may be used, but compatibility is added only after completion of recording.

As it is difficult to determine whether locating the index area 48 before the content area 44 is better than locating the index area 48 after the content area 44, one of the two formats may be selected. It is preferable to allow each user to enable or disable the function because some existing recording devices cannot handle appearance of an unexpected index area.

Figure 5:
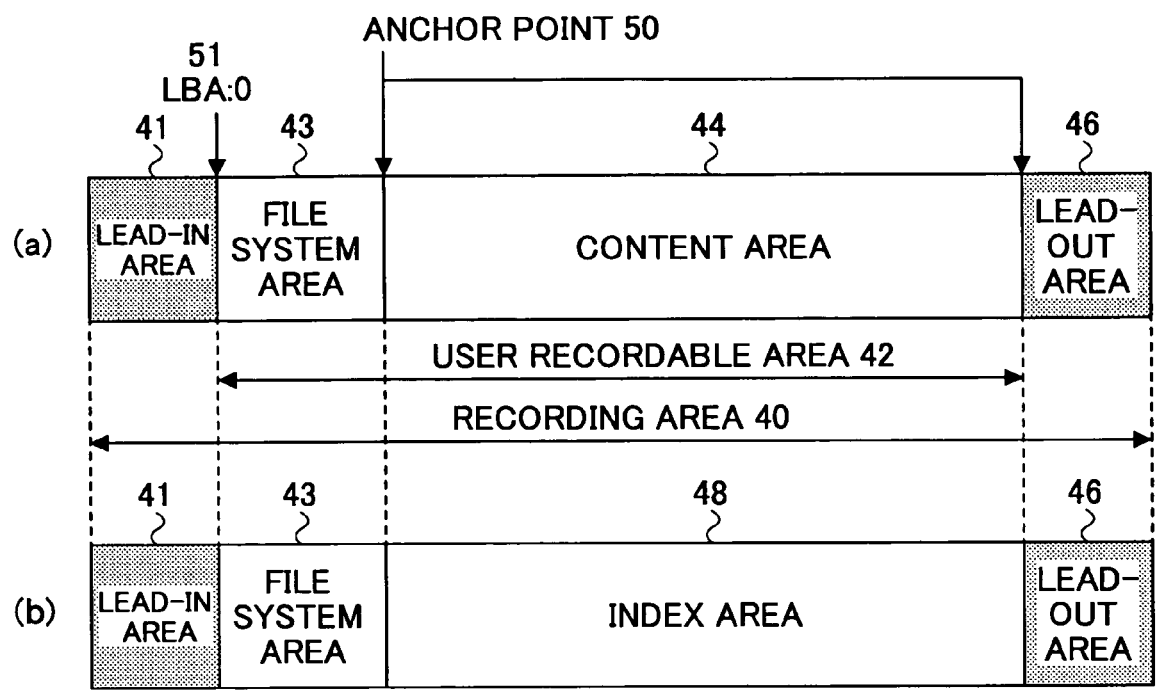
FIG. 5 shows formats for storing time series data representing content and index information items thereof in different optical disks.

FIG. 5 shows formats used for storing time series data representing content and index information items thereof in different optical disks.

As shown in (b), the index information items are recorded in an index area 48 in an optical disk (FIG. 5 (*b*)), and the content is recorded in a content area 44 in another optical disk (FIG. 5 (*a*)).

This system is disadvantageous in that plural optical disk drives are required or replacement of optical disks after recording of the content is required for recording the index information. However, since the layout is the same as that of reproduction-only optical disks, it is advantageous in that there is no need to consider compatibility.

This system is available if a memory card can be used separately from the main optical disk in which the content is recorded. In this format, a time sequence index information group may precede or follow a reverse time sequence index information group in the index area 48.

The following describes a relationship between index information items and an index information group.

An index information group is a collection of index information items for locating addresses of particular points of time series data.

A time sequence index information group is a collection of index information items arranged in the order of time sequence of data portions of the time series data. The data portions result from dividing the time series data representing content by, e.g., certain time lengths (which may or may not be the same). Each of the data portions is image data representing an image. The index information items are for locating the corresponding data portions based on addresses thereof. A reverse time sequence index information group is a collection of the index information items which are arranged in the reverse order of time sequence of the data portions.

The time lengths of the data portions of the time series data to be indicated by the index information items of the time sequence index information group may be different from the time lengths of the data portions of the time series data to be indicated by the index information items of the reverse time sequence index information group.

Figure 6:
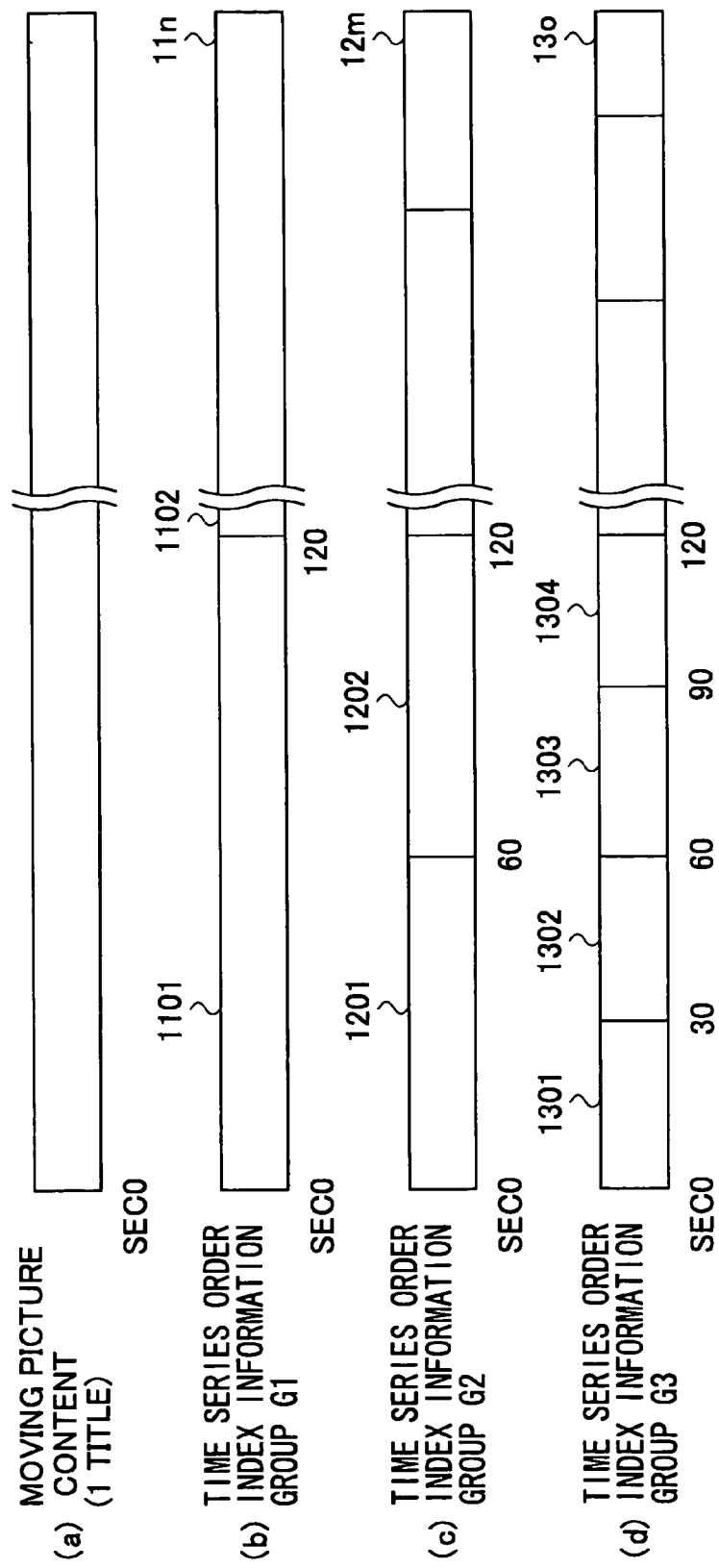
FIG. 6 schematically shows configurations of time sequence index information groups.

FIG. 6 schematically shows configurations of time sequence index information groups.

The index information items are data items for locating particular points of content recorded in the form of time series data. If the content is data representing a moving picture such as a movie or a television program, the index information items can be expressed in MPEG7 (Moving Picture Experts Groups 7) and can be recorded in various information recording media such as HDs (hard disks).

In a time sequence index information group, the index information items for locating particular points of the moving picture content (one movie or one television program) represented by a set of the time series data are arranged and stored in the order according to the progress of the moving picture. Each index information item may contain, for example, a frame of the moving picture content or the recording time of a frame.

In FIG. 6, the lengths of the index information items schematically shown as blocks do not represent the data volumes of the index information items but schematically represent the corresponding portions of the content.

For example, in the case of a time series index information group G1 of FIG. 6 (*b*), index information items 1101, 1102, . . . correspond to data portions (each having a unique address. This also applies to the following description) resulting from dividing time series data representing moving picture content by a time length of 120 seconds. That is, the index information items 1101 and 1102 correspond to a segment of the moving picture of 0-120 th second and a segment of the moving picture of 120-240 th second, respectively, resulting from dividing the time series data representing the moving picture content by a time length of 120 seconds.

In the case of a time series index information group G2 of FIG. 6 (*c*), index information items 1201, 1202, 1203, . . . correspond to data portions resulting from dividing time series data representing moving picture content by a time length of 60 seconds. That is, the index information items 1201, 1202, and 1203 correspond to a segment of the moving picture of 0-60 th second and pictures of 60-120 th second, and a segment of the moving picture of 120-180 th, respectively, resulting from dividing the time series data representing the moving picture content by a time length of 60 seconds.

In the case of a time series index information group G3 of FIG. 6 (*d*), index information items 1301, 1302, 1303, . . . correspond to data portions resulting from dividing time series data representing a moving picture content by a time length of 30 seconds.

If the time of the content is divisible by the specified time length, the resulting data portions have the same time length. However, if the time of the content is not divisible by the specified time length, the last data portion has a smaller time length than the other data portions. An index information item (11*n*, 11*m*, or 13*o*) is allocated to the last data portion having a smaller time length than the other data portions as in the case of the other data portions.

Each of the index information items 1101, 1102, . . . , 1201, 1202, . . . , 1301, 1302, . . . contains information for identifying the corresponding segment of the moving picture, and image data of at least one frame contained in the corresponding segment of the moving picture. The information for identifying the corresponding segment of the moving picture indicates the time of the corresponding segment relative to the entire content data, and contains, e.g., the start time and the end time.

For instance, the index information item 1101 contains time information such as the start time "0" and the end time "120". The index information item 1202 contains time information such as the start time "60" and the end time "120". The index information item 1302 contains time information such as the start time "30" and the end time "60".

The image data contained in each index information item may be any one of frames within the corresponding segment of the moving picture. For instance, the image data may be a top frame or a middle frame (in the case of the segment of 0-120 th second, the frame replayed in the 60 th second) of the corresponding segment.

In a reverse time sequence index information group, the index information items for locating particular points of the moving picture content (one movie or one television program) represented by a set of the time series data are arranged and stored in reverse order to the progress of the moving picture, i.e., in reverse time sequence.

For example, in the case of a reverse time sequence index information group containing the same index information items as the index information group G3 shown in FIG. 6 (*d*), the index information items 1301, 1302, 1303, 1304, . . . that correspond to data portions resulting from dividing the moving picture content by a time length of 30 seconds are arranged and stored in the order of . . . , 1304, 1303, 1302, and 1301.

If each index information item of an index information group contains image data of at least one frame, image data are read and reproduced from each index information item of the index information group. Thus, images of every time length used for division are sequentially displayed, and each of which is displayed for a predetermined time. For example, in the case of the time sequence index information group G2, images of every 60 second are sequentially displayed, each of which is displayed for a predetermined time.

In the case of the reverse time sequence index information group, if image data are read and reproduced at a predetermined time interval from each index information items, images are sequentially displayed in reverse time sequence, each of which is displayed for a predetermined time.

Figure 7:
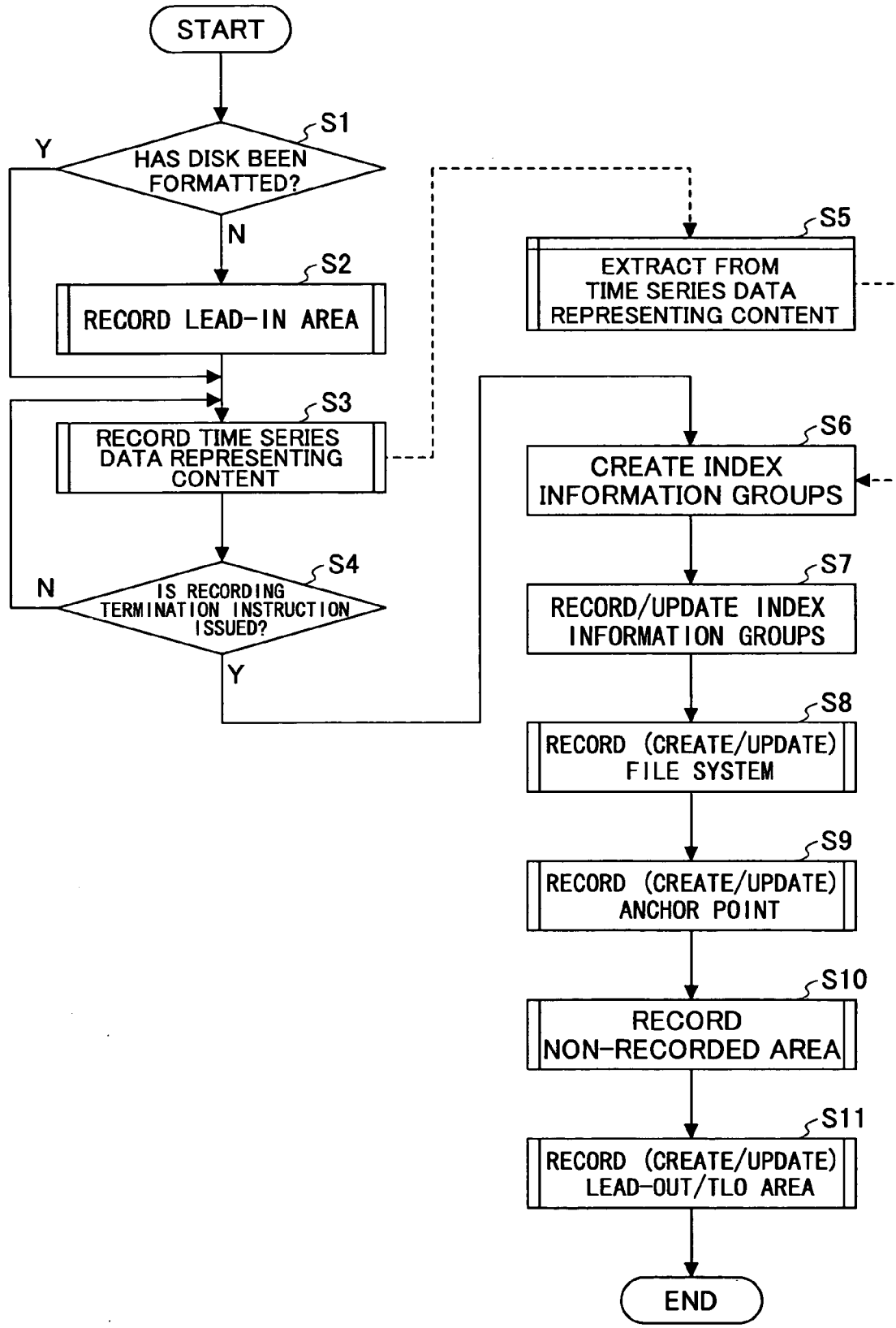
FIG. 7 is a flowchart showing a procedure of recording index information items after completion of recording time series data by a controller of an optical disk drive or a CPU of a host computer.

FIG. 7 is a flowchart showing a procedure of recording the index information items after completion of recording the time series data by the controller of the optical disk drive or the CPU of the host computer.

When recording the time series data is started or when the optical disk is loaded, the controller 19 (or the CPU 29) determines whether the optical disk has been already formatted in Step (indicated by "S" in FIG. 7) 1. If the optical disk has not been formatted, then in Step 2 a Lead-In area of a recording area is recorded in the optical disk so as to format the disk (write-once optical disks do not require this process). Then the processing proceeds to Step 3. In Step 3, the time series data are recorded in a content area of the optical disk.

At the same time, in Step 5, data portions that can be used as index information items are extracted from the time series data that are recorded in Step 3, and the address of the locations where the data portions are to be recorded and the data portions are stored. The address and the data portions may preferably be stored in the RAM 27, a recording area having no influence, or a different information recording medium.

In Step 4, it is determined whether an instruction for terminating the recording is issued from, e.g., a stop button. If a recording termination instruction is not issued, the processing returns to Step 3. If a recording termination instruction is issued, the processing proceeds to Step 6 for creating the index information items. In the process of creating the index information items, the extracted data portions are processed according to user's instructions if possible. Also, the time sequence index information group in which the index information items for locating particular points of the time series data are arranged in time sequence and the reverse time sequence index information group in which the index information items are arranged in reverse time sequence are created. In Step 7, the created index information groups are recorded or updated in an index area of the optical disk.

In Step 8, a file system area 43 is recorded (created or updated) so as to allow other devices to recognize the content and the index information groups, and then in Step 9 an anchor point 50 is recorded (created or updated). In Step 10, if there is a non-recorded area within the area from the address zero "LBA:0" 51 to the maximum address where the recording ends, the non-recorded area is recorded to form a continuous area. Then in Step 11 a Lead-Out area 46 is recorded.

In Step S11, if the optical disk is a DVD+RW disc or a CD-MRW disc, a TLO area 49 is recorded (created or updated) instead. Thus the procedure is completed.

The procedure described above is advantageous in that index information items can be recorded all at once at the end and therefore processing by users is allowed. Therefore, index information items effective for each user can be easily created.

Figure 8:
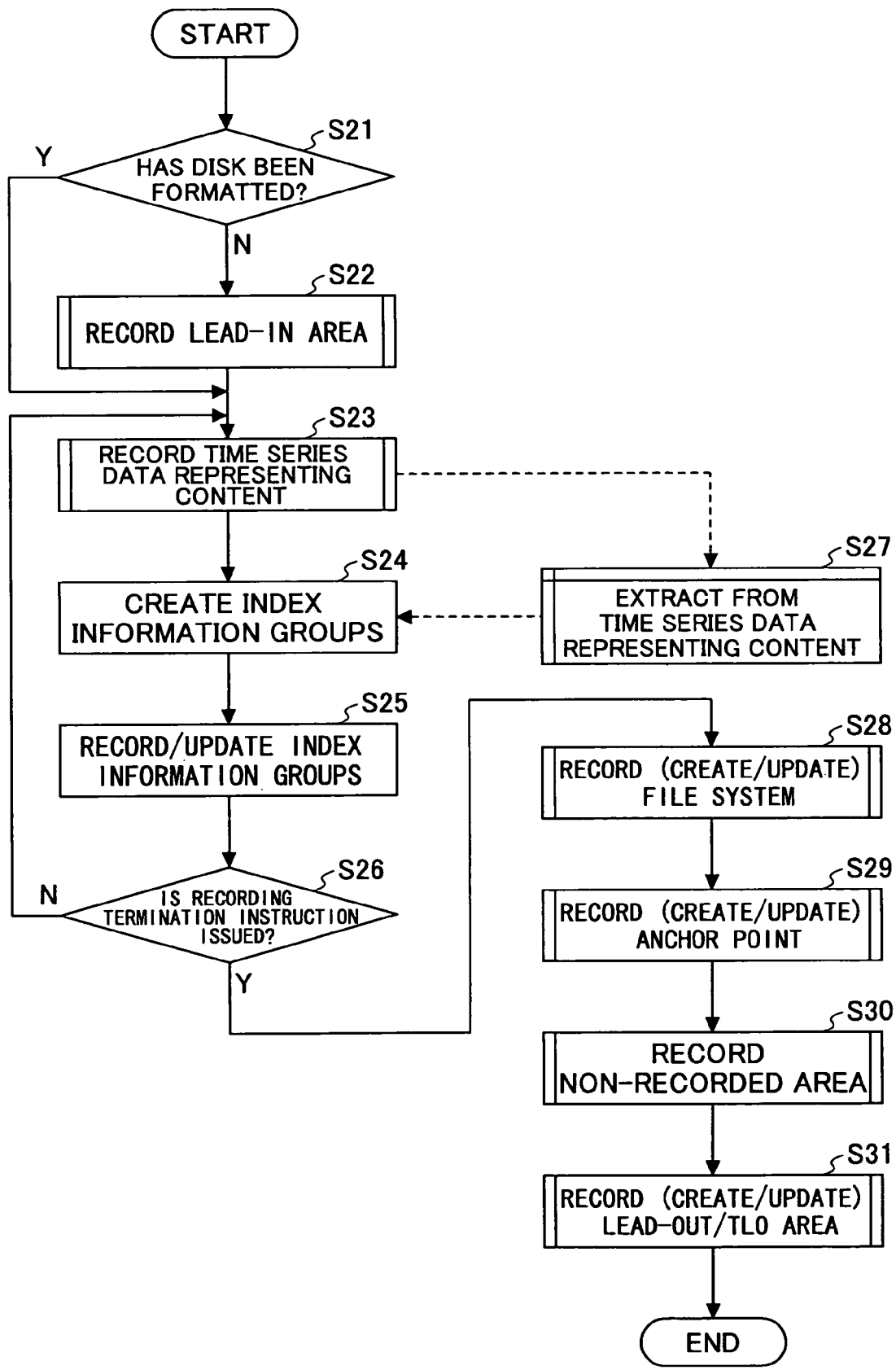
FIG. 8 is a flowchart showing a procedure of simultaneously recording index information items and time series data by a controller of an optical disk drive or a CPU of a host computer.

FIG. 8 is a flowchart showing a procedure of simultaneously recording the index information items and the time series data by the controller of the optical disk drive or the CPU of the host computer.

When recording is started or when the optical disk is loaded, the controller 19 (or the CPU 29) determines whether the optical disk has been already formatted in Step (indicated by "S" in FIG. 8) 21. If the optical disk has not been formatted, then in Step 23 a Lead-In area of a recording area is recorded in the optical disk so as to format the disk (write-once optical disks do not require this process). Then the processing proceeds to Step 23. In Step 23, the time series data are recorded in a content area of the optical disk. In parallel with this process, in Step 27, data portions that can be used as index information items are extracted from the time series data, and the extracted data portions and the address of the data portions are stored separately. The address and the data portions may preferably be stored separately in the RAM 27, a recording area having no influence, or a different information recording medium.

Then the processing proceeds to Step 24 for creating the index information items. In the process of creating the index information items, the extracted data portions are processed according to user's instructions if possible. Also, the time sequence index information group in which the index information items for locating particular points of the time series data are arranged in time sequence and the reverse time sequence index information group in which the index information items are arranged in reverse time sequence are created. In Step 25, the created index information groups are recorded or updated in an index area of the optical disk.

In Step 26, it is determined whether an instruction for terminating the recording is issued from, e.g., a stop button. If a recording termination instruction is not issued, the processing returns to Step 23. If a recording termination instruction is issued, the processing proceeds to Step 28. In Step 28, a file system area 43 is recorded (created or updated) so as to allow other devices to recognize the content and the index information groups, and then in Step 30 an anchor point 50 is recorded (created or updated). In Step 30, if there is a non-recorded area within the area from the address zero "LBA:0" 51 to the maximum address where the record ends, the non-recoded area is recorded to form a continuous area. Then in Step 31 a Lead-Out area 46 is recorded.

In Step S31, if the optical disk is a DVD+RW disc or a CD-MRW disc, a TLO area 49 is recorded (created or updated) instead. Thus the procedure is completed.

In the case of hard disks or the like, as the recording speed and seek speed are very high, creation and recording of the index information items may be performed at the same time. However, in the case of a replaceable information recording medium such as optical disks, as the recording speed and the seek speed are relatively low, it is preferable to create index information items as needed and record them all at once when the certain number of index information items are created.

This procedure is advantageous in that recording the index information items will have been completed when the termination instruction is issued, and the waiting time from the issue of the termination instruction to ejection of the optical disk can be reduced. Accordingly, this procedure is suitable for recording index information items related to clock time or time amount, e.g., index information items for quick look or a digest.

Figure 9:
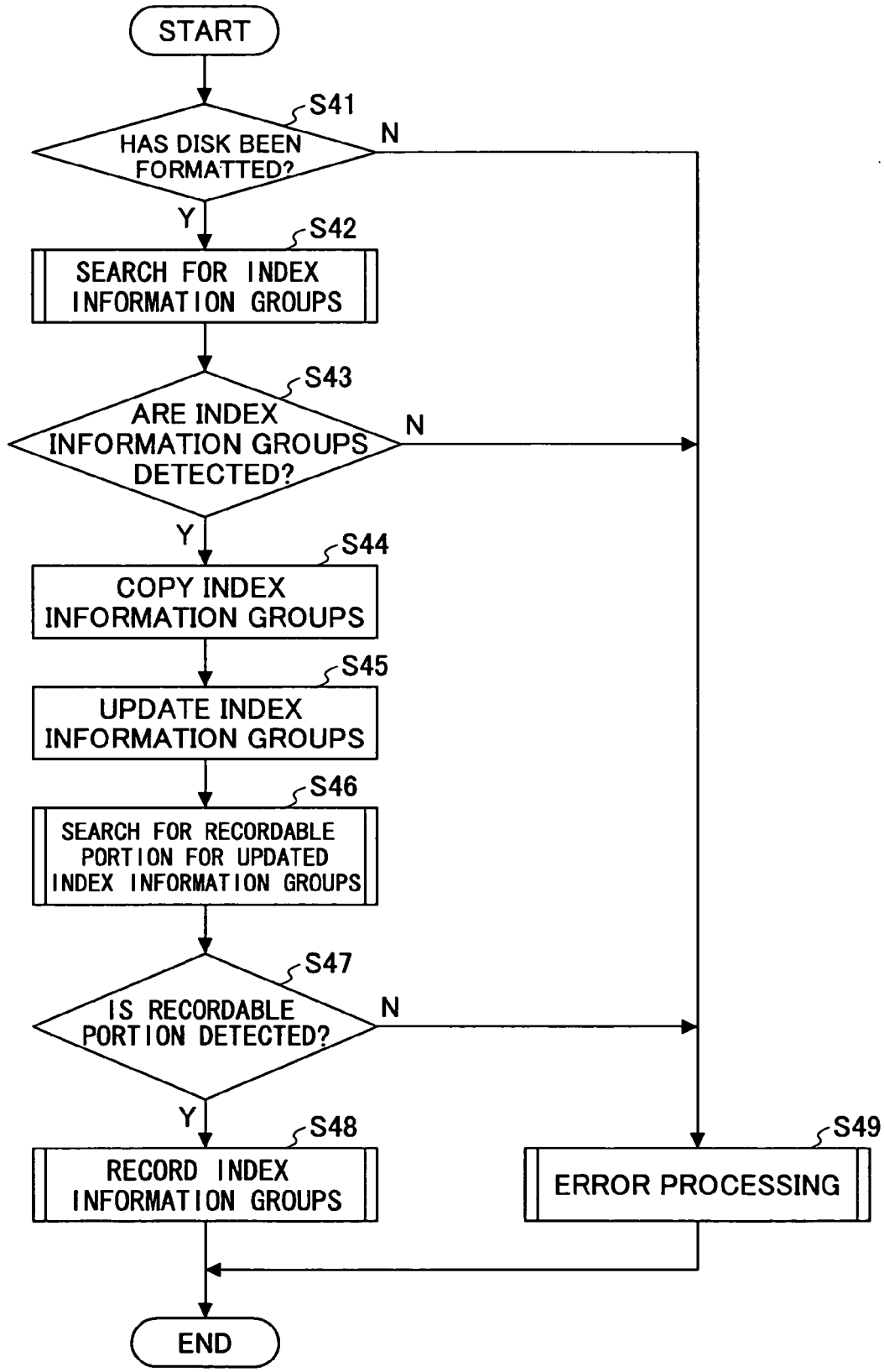
FIG. 9 is a flowchart showing a procedure of moving index information groups by a controller of an optical disk drive or a CPU of a host computer.
Figure 10:
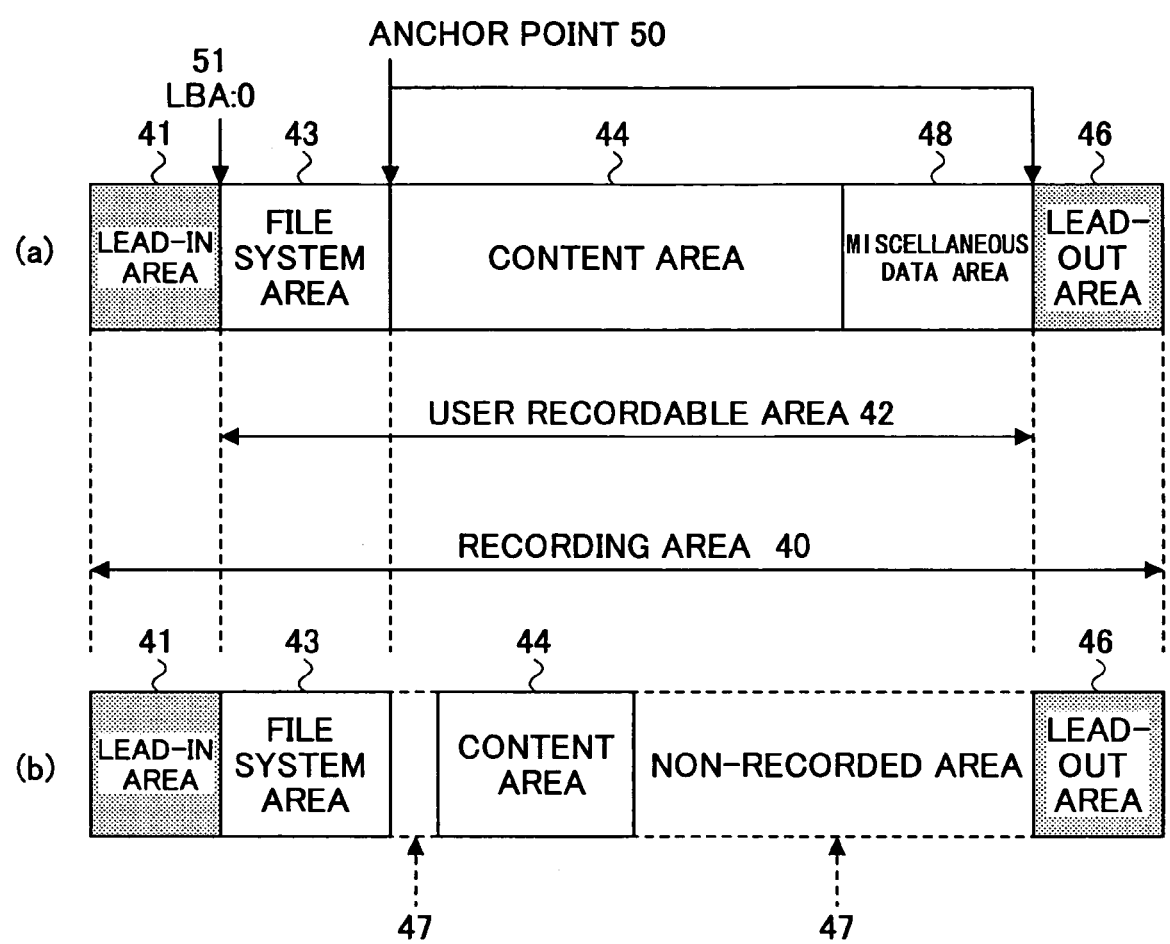
FIG. 10 shows layout examples of an information recording medium for recording and reproducing time series data in linear addressing.

FIG. 9 is a flowchart showing a procedure of moving index information groups by the controller of the optical disk drive or the CPU of the host computer.

In Step (indicated by "S" in FIG. 9) 41, the controller 19 (or the CPU 29) determines whether the optical disk has already been formatted. If the optical disk has not been formatted, the processing proceeds to Step 49 in which error processing is performed. Thus, the operation is terminated.

If, in Step 41, the optical disk is determined to be formatted, then in Step 42 a time sequence index information group and a reverse time sequence index information group are searched for. In Step 43, it is determined whether the index information groups are detected. If the index information groups are not detected, the processing proceeds to Step 49 in which error processing is performed. Thus the procedure is terminated.

If, in Step 43, the time sequence index information group and the reverse time sequence index information group are detected, then in Step 44 the index information groups are copied. In Step 45 the index information groups are updated, and then in Step 46 a recordable portion for the index information groups is searched for. In Step 47, it is determined whether a recordable portion for the index information groups is detected. If a recordable portion is not detected, processing proceeds to Step 49 in which error processing is performed. Thus the procedure is terminated.

If, in Step 47, a recordable portion for the index information groups is detected, then in Step 48 the time sequence index information group and the reverse time sequence index information group are recorded in the recordable portion. Thus the procedure is completed.

In other words, in the first step, it is determined whether a recording operation has been already performed on the optical disk. Then, the time sequence index information group and the reverse time sequence index information group are searched for to confirm the presence thereof. If the index information groups are detected, the index information groups are copied and updated by a user or updated based on clock time. Then, a recordable portion for the updated index information groups is searched for and recorded into the recordable portion if any. If the index information groups themselves or a recordable portion are not detected, this is recognized as an error.

This operation may be required, for example, in the case where the index area 48 is overwritten or the index information groups as described with reference to FIG. 3, and in the case where the index information groups recorded in an area with the fixed size in the front part in the optical disk need to be moved to the rear part in the optical disk due to a need for a larger recording area.

According to the above-described embodiments, an index of content is prepared in addition to the content. Also, a time sequence index information group and a reverse time sequence index information group are provided. Therefore, various searching operations and operations of saving and using summaries that suit a user's preferences but that are not covered by the existing standards can be performed. Moreover, since specifications of main parts of hardware can be maintained at a low level, hardware can be provided to users at low price.

In addition, preparing an index of the content separately from the content and having both a time sequence index information group and a reverse time sequence index information group allows recording media to have high compatibility with existing devices, high reusability, and high readability.

INDUSTRIAL APPLICABILITY

Information recording devices, information recording methods, information recording media according to the present invention are applicable to video camcorders, digital editing devices, digital cameras, game consoles, and DVD players.

The invention claimed is:

1. An information recording device comprising a controller that adjusts recording conditions including a bit rate of time series data when recording a content in an information recording medium,
    wherein the controller includes an index information group creating unit that creates a time sequence index information group in which index information items extracted from the time series data for locating particular points of the content are arranged in time sequence of the time series data, and
    a reverse time sequence index information group in which the index information items are arranged in reverse time sequence of the time series data; and
    an index information group recording unit that records the time sequence index information group and the reverse time sequence index information group created by the index information group creating unit into an area of the information recording medium different from an area where the time series data are recorded.

2. The information recording device as claimed in claim 1, wherein the index information group creating unit acquires, as the index information items, a plurality of image data items representing a plurality of images that are extracted from the time series data every predetermined time.

3. The information recording device as claimed in claim 1, wherein when the content recorded in the form of the time series data is reproduced, the index information group creating unit extracts, as the index information items, a plurality of image data items representing a plurality of images that are selected, according to a predetermined instruction, from images that change with time.

4. The information recording device as claimed in claim 1, wherein the index information group recording unit records the time sequence index information group and the reverse time sequence index information group into an area adjacent to the area where the time series data are recorded.

5. The information recording device as claimed in claim 1, wherein the index information group recording unit records the time sequence index information group and the reverse time sequence index information group into an area adjacent to a Lead-In area or a Lead-Out area of the information recording medium.

6. The information recording device as claimed in claim 1, wherein the index information group recording unit records the time sequence index information group and the reverse time sequence index information group into a predetermined area of another information recording medium different from the information recording medium in which the time series data are recorded.

7. An information recording method that records a content in the form of time series data in an information recording medium and reproduces particular points of the content, comprising:
    an index information group creating step of creating a time sequence index information group in which index information items extracted from the time series data for locating the particular points of the content are arranged in time sequence of the time series data, and a reverse time sequence index information group in which the index information items are arranged in reverse time sequence of the time series data; and an index information group recording step of recording the time sequence index information group and the reverse time sequence index information group created in the index information group creating step into an area of the information recording medium different from an area where the time series data are recorded.

8. The information recording method as claimed in claim 7, further comprising:

an index information acquiring step of acquiring, as the index information items, a plurality of image data items representing a plurality of images that are extracted from the time series data every predetermined time.

9. The information recording method as claimed in claim 7, further comprising:

an index information extracting step of reproducing the content recorded in the form of the time series data, and extracting, as the index information items, a plurality of image data items representing a plurality of images that are selected, according to a predetermined instruction, from images that change with time.

10. The information recording method as claimed in claim 7, wherein, in the index information group creating step, the index information items are acquired every time the time series data are recorded in the information recording medium so as to create the index information groups; and in the index information group recording step, the index information groups are recorded when creation of the index information groups is completed in the index information group creating step.

11. The information recording method as claimed in claim 10, wherein, in the index information group recording step, the index information groups are recorded in a predetermined area of another information recording medium different from the information recording medium in which the time series data are recorded.

* * * * *